| United States Patent [19] | [11] Patent Number: 4,774,282 |
|---|---|
| Qureshi | [45] Date of Patent: Sep. 27, 1988 |

[54] THERMOSET COMPOSITION COMPRISING AROMATIC CYANATE ESTER, ALLYL ETHERS OF BISPHENOL AND BISMALEIMIDE

[75] Inventor: Shahid P. Qureshi, Piscataway, N.J.

[73] Assignee: Amoco Corporation, Chicago, Ill.

[21] Appl. No.: 932,879

[22] Filed: Nov. 20, 1986

[51] Int. Cl.$^4$ .............................................. C08G 63/38
[52] U.S. Cl. .................................... 524/606; 524/611; 525/391; 525/392; 525/397; 525/422; 525/445; 525/467; 528/101; 528/117; 528/119; 528/152; 528/154; 528/159; 528/163; 528/170; 528/205; 528/322
[58] Field of Search ....................... 528/170, 205, 322; 524/606, 611

[56] References Cited

U.S. PATENT DOCUMENTS

| | | | |
|---|---|---|---|
| 3,398,102 | 8/1968 | Soldates et al. | 260/2 |
| 3,562,214 | 2/1971 | Kubens et al. | 260/47 |
| 3,694,410 | 9/1972 | Oehmke | 260/47 |
| 4,108,837 | 8/1978 | Johnson et al. | 528/126 |
| 4,110,364 | 8/1978 | Gaku et al. | 528/170 |
| 4,157,360 | 6/1979 | Prevorsek et al. | 260/860 |
| 4,175,175 | 11/1979 | Johnson et al. | 528/125 |
| 4,370,467 | 1/1983 | Gaku et al. | 528/170 |
| 4,448,948 | 5/1984 | Tsubaki et al. | 528/95 |
| 4,477,629 | 10/1984 | Hefner | 525/113 |
| 4,496,695 | 1/1985 | Sugio et al. | 525/391 |
| 4,528,366 | 7/1985 | Woo et al. | 528/422 |
| 4,608,426 | 8/1986 | Stern | 528/170 |

FOREIGN PATENT DOCUMENTS 0019149 11/1980 European Pat. Off. .
127629 10/1981 Japan .
1305762 2/1973 United Kingdom .

OTHER PUBLICATIONS

Research Disclosure 25736, Sep. 1985.

*Primary Examiner*—Harold D. Anderson
*Attorney, Agent, or Firm*—Richard J. Schlott; William H. Magidson; Ralph C. Medhurst

[57] ABSTRACT

Novel curable resin compositions are disclosed containing an aromatic cyanate ester and an allyl ether of a bisphenol as a modifier. These compositions provide improved prepregs and composites. Additional modifiers including epoxy resins and bismaleimides may be included.

13 Claims, No Drawings

THERMOSET COMPOSITION COMPRISING AROMATIC CYANATE ESTER, ALLYL ETHERS OF BISPHENOL AND BISMALEIMIDE

FIELD OF THE INVENTION

This invention relates to novel thermoset resins and, more particularly, to thermoset resins comprising polycyanurate and allylic resins and to curable precursors for their preparation. Still more particularly, this invention relates to compositions comprising a polymerizable cyanate ester compound and a polymerizable, allyl-substituted bisphenol compound, and to thermoset resins prepared from these compositions. These compositions are particularly useful for preparing composites and prepreg materials which comprise a fibrous reinforcement embedded in the thermoset resins.

BACKGROUND OF THE INVENTION

Advanced composites are high strength, high modulus materials which are finding increasing use as structural components in aircraft, automotive, and sporting goods applications. Typically, they comprise structural fibers such as carbon fibers in the form of woven cloth or continuous filaments embedded in a thermosetting resin matrix.

Most advanced composites are fabricated from prepreg, a ready-to-mold sheet of reinforcement impregnated with uncured or partially cured resin. Resin systems containing an epoxide resin and aromatic amine hardener are often used in prepreg since they possess the balance of properties required for this composite fabrication process. State-of-the-art epoxy/carbon fiber composites have high compressive strengths, good fatigue characteristics, and low shrinkage during cure. However, most epoxy formulations absorb moisture which reduces their higher temperature properties. As a result, they are not suitable for use at 270° F. or greater in a moisture-saturated condition. Since most epoxy formulations used in prepreg are also brittle, the resulting composites have low toughness and poor impact resistance.

Polycyanurates, or cross-linked cyanate polymers, are prepared by the cyclopolymerization of aromatic cyanate esters. Such resins have long been known in the art, as have resinous compositions comprising polycyanurates and epoxy resins, shown, for example, in U.S. Pat. No. 3,562,214. Further blends and compositions that include thermoplastic resins as well as other thermoset resins are also known, as shown in U.S. Pat. Nos. 4,157,360 and 4,496,695. These mixed compositions have been developed to overcome the inherent limitations of most polycyanurates, including brittleness, poor processability and sensitivity toward wet or moist environmental conditions. However, the compositions presently available continue to exhibit some deficiency in moisture sensitivity and in processability, particularly when used in fabricating prepreg and composite structures using fibrous reinforcement materials.

There thus is a need for resin systems which afford composites with better toughness and which can retain a high level of properties at 270° F. or greater in a moisture-saturated condition.

SUMMARY OF THE INVENTION

This invention relates to novel thermoset resins and to curable compositions for preparing the thermoset resins. The curable compositions are particularly useful for making prepreg and in forming thermoset composites. More specifically, the present invention is a curable composition comprising a polymerizable cyanate ester and a polymerizable diallyl ether of a bisphenol, and a thermoset resin prepared from said curable composition. The curable compositions may further comprise one or more additional polymerizable components, including a bismaleimide, or an epoxy resin and may be further compounded with thermoplastic resins, fillers and fibrous reinforcement.

Water-saturated unreinforced castings made from curable formulations of this invention exhibit greatly improved mechanical properties at 325° F. compared with those commonly associated with prior-art resins. The high toughness an good hot/wet properties of the cured compositions make them especially suitable for use in the production of tough, high-performance, fiber-reinforced composites. Composites prepared from these thermoset compositions exhibit an excellent balance of toughness and hot/wet properties, with unexpectedly low water uptake, high glass transition temperatures and high tensile properties. Prepreg prepared using these compositions possesses excellent and highly useful processability, drapability and tack characteristics.

DETAILED DESCRIPTION OF THE INVENTION

The cyanate ester component of the curable compositions of the present invention is a polymerizable aromatic cyanate ester compound having a plurality of cyanate ester groups per molecule. Suitable cyanate esters include those known to be useful in the production of polycyanurate and may be generally represented by the formula:

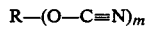

wherein m is an integer of from 2 to 5 and R is an aromatic radical, the cyanate groups being attached to an aromatic ring. The aromatic radical R will contain at least 6 carbon atoms, and may be derived, for example, from aromatic hydrocarbons such as benzene, biphenyl, naphthalene, anthracene, pyrene or the like. The aromatic radical R may also be derived from a polynuclear aromatic hydrocarbon in which at least two aromatic rings are attached to each other through a bridging member selected from the group consisting of:

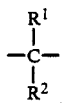

wherein $R^1$ and $R^2$ are independently selected from hydrogen and alkyl groups containing 1 to 4 carbon atoms,

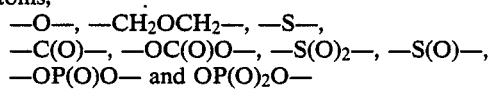

Also included are aromatic radicals derived from novolaktype phenolic resins, i.e., the cyanate esters of these phenolic resins. The aromatic radical R may also contain further, ring-attached, nonreactive substituents.

Cyanate esters useful in the practice of this invention may include, for example, 1,3-dicyanatobenzene; 1,4-dicyanatobenzene; 1,3,5-tricyanatobenzene; 1,3-, 1,4-, 1,6-, 1,8-, 2,6- or 2,7-dicyanatonaphthalene; 1,3,6-tricyanatonaphthalene; 4,4'-dicyanatobiphenyl; bis(4-cyanatophenyl)methane and 3,3',5,5'-tetramethyl bis(4-cyanatophenyl)methane; 2,2-bis(3,5-dichloro-4-cyanatophenyl)propane; 2,2-bis(3,5-dibromo-4-dicyanatophenyl)propane; bis(4-cyanatophenyl)ether; bis(4-cyanatophenyl)sulfide; 2,2-bis(4-cyanatophenyl)propane; tris(4-cyanatophenyl)phosphite; tris(4-cyanatophenyl)phosphate; bis(3-chloro-4-cyanatophenyl)methane; cyanated novolak; cyanated bisphenol-terminated polycarbonate or other thermoplastic oligomer; and mixtures thereof. Also included are cyanates of poly(alkenyl phenols) disclosed in U.S. Pat. No. 4,477,629, cyanates from bisphenols of dicyclopentadiene which are disclosed in, for example U.S. Pat. No. 4,528,366, and the cyanates disclosed in British Pat. No. 1,305,702. Especially preferred are the dicyanate of resorcinol, the dicyanate of hydroquinone, the dicyanate of 3,3',5,5'-tetramethyl diphenyl sulfide, 2,2-bis(4-cyanatophenyl)propane, bis(4-cyanatophenyl)thioether, and the cyanates of bisphenols of dicyclopentadiene of U.S. Pat. No. 4,528,366. These and a wide variety of other cyanate esters are widely known in the art and many are commercially available for use in preparing polycyanurates.

The cyanate esters may be used simply as mixtures. The cyanate esters may also be used in the form of a prepolymer, made by heating a polyfunctional cyanate monomer at a temperature of 130° to 220° C. for a period of 0.1 to 15 hours, trimerizing the cyanate ester and increasing the molecular weight. Preferred prepolymers are those having an average molecular weight of at least 400, especially up to 6000. Also useful are mixtures of the prepolymer with monomeric cyanate esters. Many of the commercially available cyanate esters are such mixtures of cyanate monomers and prepolymers.

The cyanate ester component of the instant formulations may also be used in the form of a BT resin. BT resins are prepared by heating blends of cyanates and bismaleimides, as disclosed in U.S. Pat. No. 4,110,364, which is incorporated herein by reference.

The diallyl ethers of bisphenols useful in the practice of the present invention may be described by the following general formula:

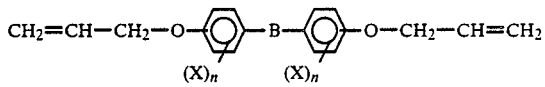

wherein B is selected from the group consisting of:

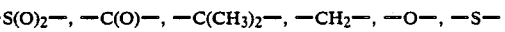

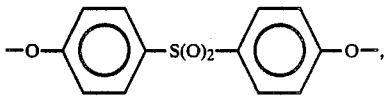

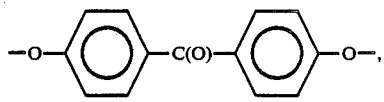

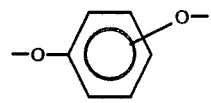

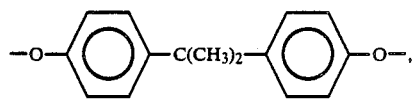

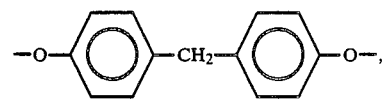

and a direct bond; each x may be the same or different and represents halogen or $C_1$-$C_6$ alkyl; and n=0 to 4.

Preferred diallyl ethers of bisphenols include diallyl ether of bisphenol S:

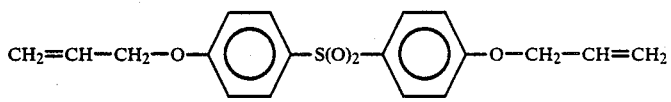

diallyl ether of bisphenol A:

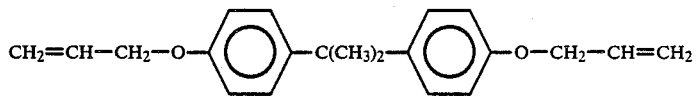

diallyl ether of bisphenol F:

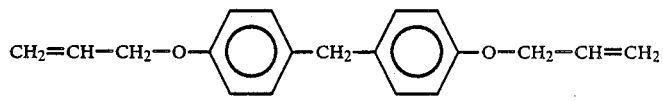

and compounds having the following structure:

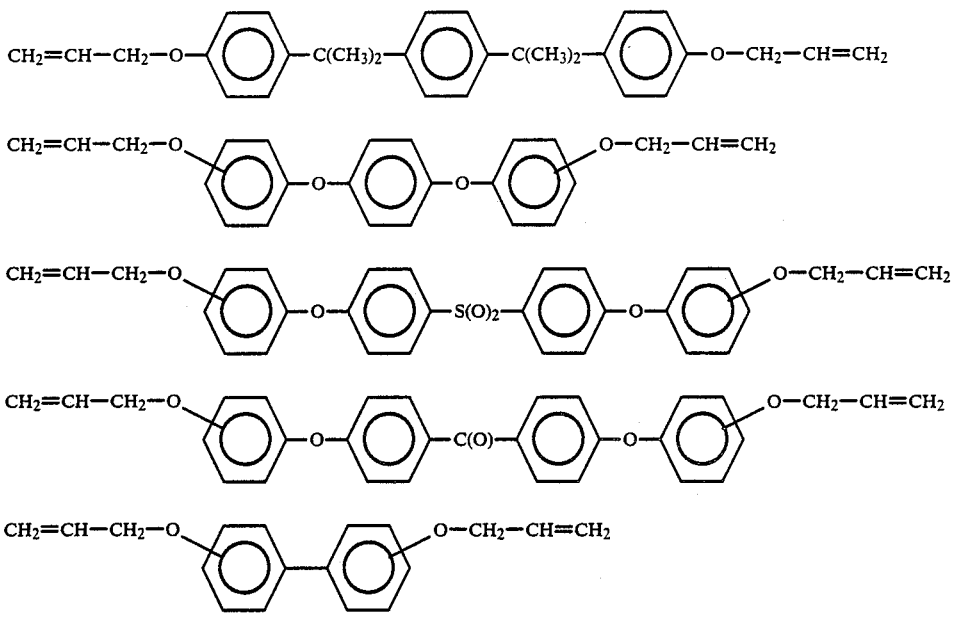

The allyl ethers useful in the practice of this invention are readily prepared by well-known methods from readily available phenolic materials and allylic halides.

The compositions of this invention will comprise from 60 to 99 wt %, preferably from 75 to 95 wt %, of the cyanate ester component, and correspondingly from 40 to 1 wt %, preferably from 25 to 5 wt %, of the diallyl ether of a bisphenol. The cyanate ester component may, as stated hereinabove, be in the form of monomeric cyanate esters, prepolymerized cyanate esters having a molecular weight greater than 400, preferably from 400 to 6000, or mixtures thereof, or may be in the form of a BT resin comprising cyanate ester and bismaleimide in a weight ratio of from about 1:1 to about 20:1 and, preferably, from about 4:1 to about 20:1.

The compositions of this invention may further comprise additional polymerizable, curable components, such as, for example, epoxy resins, bismaleimide resins and the like.

Epoxy resins useful as further components in the practice of this invention include any of the great variety of polyfunctional epoxy resins widely known and readily available from commercial sources. Among these are the polyglycidyl derivatives of phenolic compounds, such as those available commercially under the trade names such as Epon 828, Epon 1001, Epon 1009 and Epon 1031 from Shell Chemical Co., DER 331, DER 332, DER 334 and DER 542 from Dow Chemical Co., and BREN-S from Nippon Kayaku, Japan. Other suitable epoxy resins include polyepoxides prepared from polyols and the like and polyglycidyl derivatives of phenol-formaldehyde novolaks. The latter are commercially available as DEN 431, DEN 438, and DEN 439 from Dow Chemical Company. Cresol analogs are also available as ECN 1235, ECN 1273, and ECN 1299 from Ciba-Geigy Corporation. SU-8 is a Bis-A epoxy novolak from Interez, Inc. Poyglycidyl adducts of amines, aminoalcohols and polycarboxylic acids are also useful in the practice of this invention. Commercially available resins of this type include Glyamine 135, Glyamine 125, and Glyamine 115 from F.I.C. Corporation, Araldite MY-720, Araldite 0500, and Araldite 0510 from Ciba-Geigy Corporation and PGA-X and PGA-C from The Sherwin-Williams Co.

Also suitable are epoxy-terminated thermoplastic polymers such as the epoxy-terminated polysulfones disclosed in U.S. Pat. No. 4,448,948.

The bismaleimides that may be used in the present invention are organic compounds containing two maleimide groups and are prepared generally from maleic anhydride and diamines.

Bismaleimides may be described by the general formula:

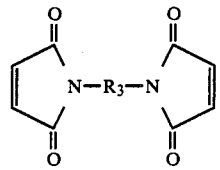

wherein $R^3$ is a divalent aromatic or alicyclic organic group.

The preferred bismaleimides are derived from aromatic diamines and most preferred are those wherein $R^3$ is a polynuclear aromatic radical. Examples of such bismaleimides include 2,2-bis(4-aminophenoxy-4-phenyl) propane bismaleimide, 4,4'-bis(3-amino phenoxy) diphenyl sulfone bismaleimide, 1,4-bis(3-aminophenyl isopropylidene) benzene bismaleimide and bis(4-aminophenyl) methane bismaleimide. The bismaleimides may be used singly or as mixtures.

It is also possible to use bismaleimides in which up to 50% of the maleimide groups have been replaced by substituted maleimide groups such as methyl maleimides or halomaleimides or by the nadimide, methyl nadimide, or isomaleimide groups. Portions of the maleimide groups may also be replaced by succinimide, phthalimide, or substituted succinimide and phthalimide groups.

The bismaleimide may be prepared by a number of well-known methods from maleic anhydride and diamines, and a great many are readily available from commercial sources.

Compositions of this invention may also include a thermoplastic polymer or a rubber which is miscible with the cyanate resins and the diallyl compound.

The thermoplastic polymers which may be used in this invention include polyarylethers such as those described in U.S. Pat. Nos. 4,108,837, 4,175,175 and 4,332,209. Also suitable are polycarbonates, polyetherimides, the poly(amide-imide) thermoplastics, and polyarylates.

The preferred thermoplastics include UDEL® P-1800 polysulfone, ARDEL® D-100 polyarylate (available from Amoco Performance Products, Inc.), Lexan-105 polycarbonate, Lexan-3250 polyestercarbonate, and ULTEM-1000 polyetherimide (available from General Electric Co.) and Victrex P-200 (available from Imperial Chemical Industries), as well as Radel R® polysulfone (available from Amoco Performance Products).

The suitable rubbers include vinyl methyl or vinyl phenyl silicone rubbers, polymers and copolymers of 1,3-butadiene, including those having terminal and/or pendent reactive functionality, such as the Hycar Reactive Liquid Polymers available from B. F. Goodrich and the 1,2-polybutadiene resins available from Nippon Soda Co., and the polybutadiene resins available from Arco Chemical Co. as Poly-BD resins. Etylene/acrylic copolymers and saturated polyester elastomers may also be used, as may the Vitel polyesters from Goodyear Chemicals and LP-polyesters from Nippon Gohsei.

Cure accelerators may also be used in the practice of this invention to facilitate cyanate trimerization and/or epoxy/cyanate coreaction. The cure accelerators and catalysts are those conventionally used for these purposes, and may include phenols, tertiary amines, alcohols, salts such as LiCl, and soluble transition metal complexes such as zinc octoate, copper acetylacetonate, cobalt naphthenate and the like. U.S. Pat. Nos. 3,694,410 and 4,528,366 describe several such catalysts and levels for their effective use.

When the compositions comprise bismaleimides, peroxide cure accelerators such as dicumyl peroxide, di-t-butyl peroxide, t-butyl perbenzoate, and 1,1-bis(t-butylperoxy) cyclohexane may also be included. Free radical inhibitors such as phenothiazine or benzoquinone are frequently employed in the resin art to increase storage stability, and these compounds may also be included in the compositions of this invention.

The added components may be added to the composition at any desired level. However, for most purposes, the polymerizable and thermoplastic resin components will be included at a level of from about 5 to 20 pbw, per hundred parts combined weight of cyanate ester and allyl ether in the composition. Cure accelerators, when employed, will be present in an amount of from about 0.001 to 5 weight percent, preferably about 0.01 to 2 weight percent, again based on base composition. The peroxides are conventionally used at levels of 0.01 to 1 pbw per 10 parts of bismaleimide in a formulation.

The compositions of this invention will most often be employed in combination with fiber reinforcement in the preparation of structural composites. The structural fibers which may be used in preparing such composites include carbon, graphite, glass, silicon carbide, poly(benzothiazole), poly(benzimidazole), poly(benzoxazole), alumina, titania, boron, and aromatic polyamide fibers. These fibers are characterized by a tensile strength of greater than 100,000 psi, a tensile modulus of greater than two million psi, and a decomposition temperature of greater than 200° C. The fibers may be used in the form of continuous tows (1000 to 400,000 filaments each), woven cloth, whiskers, chopped fiber or random mat. The preferred fibers are carbon fibers, aromatic polyamide fibers such as Kevlar 49 fiber (obtained from E. I. DuPont de Nemours, Inc.), silicon carbide fibers, and glass fibers. Composites generally comprise about 20 to about 80 percent by weight of structural fiber, and preferably between 30 and 75 percent by weight.

The structural fiber will ordinarily be combined with the curable resin compositions of this invention to provide preimpregnated reinforcement or prepreg. Prepreg may be prepared by any of the several techniques well known and commonly used in the art. For example, the resin may be first coated as a thin film on release paper. Aligned tows of carbon fiber are then pressed between two sheets of the coated paper and passed through a series of heated rollers to effect wet-out of the fiber tows by the resin. The resulting prepreg is then allowed to cool and is taken up on a spool. Tacky, drapable prepreg can be obtained with the curable compositions of this invention having a long shelf life, typically four to six weeks. Composites may be prepared from the prepreg by curing with heat, optionally under pressure. Composites may also be prepared from the curable compositions of this invention via wet lay-up followed by compression molding, by transfer molding, or by resin injection, as described in European Patent Application No. 0019149, published Nov. 26, 1980. Composites employing the compositions of this invention may also be fabricated in a filament-winding operation, wherein preimpregnated tow is wound over a rotating and removable form or mandrel and cured in an oven or autoclave.

In addition to structural fibers, the composition may also contain particulate fillers such as talc, mica, calcium carbonate, aluminum trihydrate, glass microballoons, phenolic thermospheres, and carbon black as well as thixotropic additives such as fumed silica. Up to half of the weight of structural fiber in the composition may be replaced by one or more of such fillers.

EXAMPLES

The practice of this invention will be better understood by consideration of the following examples. These examples are provided as specific illustrations of the practice of this invention and are not intened to be in any way limiting of the scope of this invention.

EXAMPLES 1-4; CONTROL EXAMPLES A-J with a paddle stirrer,

A two-liter flask equipped thermometer, temperature controller, inlet and outlet for inert gas and an electric heating mantle was charged with 200 g of the indicated BT resin (see Tables I and II). After the resin was heated to 120° C., 30 g of allyl compound (as indicated in Tables I and II) were added, and the mixture was heated at 120° C. until a homogenous solution was obtained. The solution was degassed, then poured into a preheated glass mold with a cavity of dimensions $\frac{1}{8} \times 8 \times 8$ inches and cured. The curing was carried out using programmed heating cycles of 100° C./2 hrs, 179° C./4 hrs and 246° C./4 hrs, with a heating rate of 1° C./min.

Castings were tested to determine mechanical and moisture-resistant properties. Tensile properties were measured according to ASTM D-638 using a Type I dog bone specimen. Glass transition temperature (Tg) was measured by DuPont-982 Dynamic Mechanical Analyzer at a heating rate of 10°/min. Flex specimens (5"×1"×⅛") were soaked in water at 160° F. for three weeks and tested using ASTM-790 method.

The properties of the unreinforced castings of Examples 1–4, as well as ten controls, are summarized in Tables I and II.

TABLE I

UNREINFORCED CASTING PROPERTIES

| | Example No.: | | | | | | | |
|---|---|---|---|---|---|---|---|---|
| | A | 1 | 2 | 3 | B$^a$ | C | D | E |
| Components (1) | | | | | | | | |
| BT-2164, pbw: | 100 | 100 | 100 | 100 | 100 | 100 | 100 | 100 |
| Allylic Cmpd: | None | DEBS | DEBA | DEBP | TAIC | DAP | DABA | AP |
| pbw: | — | 15 | 15 | 15 | 15 | 15 | 15 | 15 |
| Properties: | | | | | | | | |
| Tensile Str. (kpsi): | 11.5 | 13.1 | 11.9 | 11.9 | 11.1 | 11.9 | | |
| Tensile Mod. (kpsi): | 395 | 420 | 418 | 430 | 412 | 430 | Note 2 | Note 2 |
| El. (%): | 4.0 | 4.4 | 3.9 | 3.5 | 3.2 | 3.5 | | |
| Tg (°C.): | 278 | 260 | 240 | 232 | 258 | 232 | | |
| Water Abs. (%): (3 wk/160° F. Soak) | 2.8 | 2.3 | 2.3 | 2.0 | 2.2 | 2.3 | | |
| Flex Mod.: 325° F. Wet (kpsi) | 150 | 190 | 170 | 170 | 157 | 66 | | |

Notes:
(1) BT Resins: BT-2160 comprising a 90/10 ratio of 2,2-bis(4-cyanatophenyl)propane and 4,4'-diaminophenyl methane bismaleimide, heated to 16% cyanate polymerization. BT-2164 is a polyester modified version of BT-2160. Both were obtained from Mitsubishi Gas Chemical Co., Japan. Allyic Compounds: TAIC = Triallyl Isocyanurate; DEBS = Diallylether of Bisphenol S or Bis(4-allyloxphenyl) sulfone; DEBA = Diallylether of Bisphenol A or Bis(4-allyloxyphenyl) propane; DEBP = Diallylether of Bisphenol or 4,4'Diallyloxybiphenyl; DAP = Diallylphthalate; DABA = Diallyl Bisphenol-A or 2,3-Bis(3-allyl-4-hydroxyphenol) propane; AP = 2-Allylphenol.
2 Composition too reactive; gelled and could not be processed.

TABLE II

UNREINFORCED CASTING PROPERTIES

| | Example No.: | | | | | |
|---|---|---|---|---|---|---|
| | F | 4 | G | H | I | J |
| Components (1) | | | | | | |
| BT-2160, pbw: | 100 | 100 | 100 | 100 | 100 | 100 |
| Allylic Cmpd: | None | DEBS | DAP | TAIC | DABA | AP |
| pbw: | — | 15 | 15 | 15 | 15 | 15 |
| Properties: | | | | | | |
| Tensile Str. (kpsi): | Note 3 | 10.8 | 5.0 | 9.8 | Note 2 | Note 2 |
| Tensile Mod. (kpsi): | | 470 | 500 | 480 | | |
| El. (%): | | 2.7 | 1.1 | 2.4 | | |
| Tg (°C.): | | 260 | 255 | 260 | | |
| Water Abs. (%): (3 wk/160° F. Soak) | | 2.1 | 2.1 | 2.1 | | |
| Flex Mod.: 325° F. Wet (kpsi) | | 270 | 126 | 240 | | |

Notes:
(1) (See Table I)
2 (See Table I)
3 Composition too brittle to test.

From a comparison of tensile properties and flexural modulus values for the compositions of Examples 1–4 with those for Control Examples A–J, it will be apparent that the compositions of this invention exhibit considerably improved properties. Specifically, the compositions of this invention exhibit higher toughness (as judged by tensile properties) and better hot/wet properties (as shown by flex modulus) than the compositions based on the allyl-substituted phenols and allyl esters, taught by the prior art Control Examples B–E and G–J and those that do not contain an allyl compound (Control Examples A and F).

EXAMPLE 5

A three-liter flask equipped as in Example 1 was charged with 410 g of BT-2160 resin and 435 g of BT-2164 resin. After the contents of the flask were heated to 140° C., 130 g of bis(4-allyloxyphenyl)sulfone and 25 g of polyestercarbonate (Lexan-3250, General Electric Co.) were added. The mixture was heated for 90 minutes at 140° C., giving a homogenous resin mixture having tack and film properties appropriate for making prepreg. The resin mixture was coated on a release paper and used in a conventional process to make a unidirectional prepreg tape with a polyacrylonitrile-based carbon fiber (Thornel® T-40, from Amoco Performance Products, Inc.; typical characteristics are 800 kpsi tensile strength, 40–42 mpsi Young's modulus and 12,000 filaments per tow).

The prepreg tape contained approximately 32 wt % resin, had a fiber area weight of 145 g/m$^2$ and was 6 inches wide. A 6"×12", 10-ply laminate with a ply orientation of [(±25) 90]$_s$ was laid up with this prepreg and cured first in an autoclave (4 hours at 179° C.) and subsequently in a forced air oven for 4 hours at 246° C.

Five test specimens with dimensions of approximately 1"×10" were cut from the laminate and tested to determine Edge Delamination Strength (EDS). The EDS test has been implemented in the aerospace industry to assess the toughness of composites. The test procedure used followed that of the T. K. O'Brien reference (*SAMPE Journal*, Vol. 18, No. 4, July/August 1982, p. 8). The EDS of this sample was determined to be 39 kpsi.

The flex modulus at 325° F. wet (after 3 week soak at 160° F.) on the casting based on this composition, prepared and tested substantially by the procedures used with Examples 1–4, was determined to be 230 kpsi.

EXAMPLE 6

This composition was prepared and formed into a composite substantially by the process and procedures of Example 5, except that the poly (ester carbonate) was replaced with polyarylate (ARDEL D-100).

The EDS of the composites of this Example was determined to be 38 kpsi, the flex modulus at 325° F.

wet (after 3 week soak at 160° F.) on the casting, prepared and tested as in Examples 1-3, was determined to be 230 kpsi.

EXAMPLE 7

A five-liter flask equipped as in Example 1 was charged with 1250 g of BT-2160 resin. After the contents of the flask were heated to 10° C., 82.5 g of polyarylate ARDEL D-100 and 168 g of bis(4-allyloxyphenyl)sulfone were added. The mixture was heated for 150 min at 140° C. At the end of this period, a homogenous resin mixture was obtained which gave proper tack and film properties for making prepreg. The resin mixture was discharged into pans and coated on release paper. Unidirectional prepreg tape was made with this mixture and fiber, and laminates were laid up, cured and tested as in Example 5. The EDS of this composite was determined to be 33 kpsi; flex modulus at 325° F. wet (after 3 week soak at 160° F.) on the casting was determined to be 266 kpsi.

EXAMPLE 8

A five-liter flask equipped as in Example 7 was charged with 833 g of BT-2160 resin. After the contents of the flask were heated to 140° C., 112 g of bis(4-allyloxyphenyl)sulfone were added. The mixture was prepolymerized for 180 minutes at 140° C. At the end of this period, a homogenous resin mixture was obtained which gave proper tack and film properties for making prepreg. The resin mixture was discharged into pans and coated on release paper. Unidirectional tape (6 inches wide), was made with this mixture and polyacrylonitrile-based carbon fiber. (Thornel ® T-300 from Amoco Performance Products, Inc.; typical characteristics are 500 kpsi tensile strength, 33 msi Young's modulus, 1.76 g/cc density and 12,000 filaments per tow.) A laminate was laid up, cured and tested as in Example 7. The EDS of this composite was determined to be 49 kpsi; flex modulus at 325° F. wet (after 3 week soak at 160° F.) on the casting was determined to be 270 kpsi.

As demonstrated by Examples 5-8, the curable compositions of this invention impart superior toughness to composites (high edge delamination strengths). The resins also possess good mechanical properties (high flex modulus) at elevated temperatures after extended exposure to moisture.

EXAMPLE 9

Using the equipment substantially as for Examples 1-4, a composition comprising 100 g of bisphenol A dicyanate prepolymer having approximately 15% prepolymerized cyanate (RDX 80352 from Interez, Inc.) and 15 g of bis(4-allyloxyphenyl) sulfone was prepared by heating for 15-20 minutes at 120° C. The homogeneous cyanate/allyl mixture was degassed, then cast and cured as in Examples 1-4. The properties of the cast composition were $T_g=260°$ C.; water-uptake=2% and Flex Modulus=270 ksi at 325° F. (after 3-week soak at 160° F.).

This invention will thus be seen to be a curable composition comprising a polymerizable cyanate ester and polymerizable allyl ether of a bisphenol, and thermoset resins prepared from these compositions. The compositions may further comprise one or more additional polymerizable curable components, including epoxy resins and/or bismaleimides, and may include thermoplastic resins, as well as cure accelerators, fillers, fiber reinforcement, heat and light stabilizers, pigments, dyes and the like. The compositions of this invention may be used as matrix resins for composites, as high temperature coatings and as adhesives. Fiber-reinforced composites based on these compositions may be used as aircraft parts such as wing skins, wing-to-body fairings, floor panels, flaps, radomes; as automotive parts, such as drive shafts, bumpers, and springs; and in the construction of pressure vessels, tanks and pipes. They may also be suitable for use as protective armor on military vehicles and for sporting goods applications such as golf shafts, tennis rackets, and fishing rods. Further additions and modifications may also be made without departing from the spirit and scope of the invention, which is defined by the appended claims.

What is claimed is:

1. A curable composition comprising carbon fiber, a cyanate ester having the formula:

wherein m is an integer of from 2 to 5 and R is an aromatic radical, a bismaleimide, and at least one diallyl ether of a bisphenol having the following general formula:

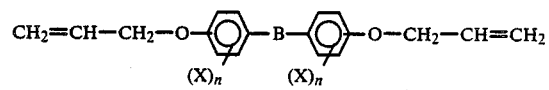

wherein B is selected from the group consisting of

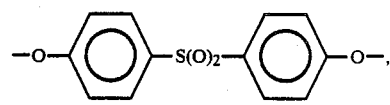

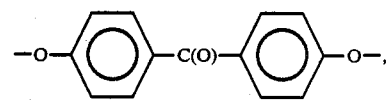

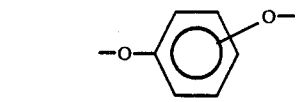

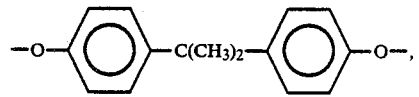

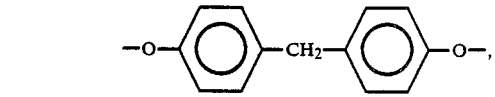

or is a direct bond; x is independently selected from the group consisting of halogen and $C_1$-$C_6$ alkyl groups and n is 0 to 4.

2. The composition of claim 1 wherein the aromatic radical R contains at least 6 carbon atoms and is a polynuclear aromatic hydrocarbon radical.

3. The composition of claim 1 wherein the aromatic radical R is a polynuclear aromatic hydrocarbon radical having at least two benzene rings bonded to each other by a bridging member.

4. The composition of claim 1 wherein the cyanate ester is the dicyanate of bisphenol A.

5. The composition of claim 1 wherein the bismaleimide may be described by the following general formula:

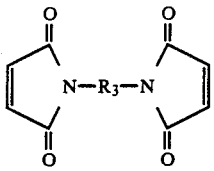

wherein $R^3$ is a divalent organic group.

6. The composition of claim 5 wherein $R^3$ is a polynuclear aromatic radical.

7. The composition of claim 1 wherein the diallyl ether is diallyl ether of bisphenol F.

8. The composition of claim 1 wherein the diallyl ether is the diallyl ether of bisphenol S.

9. A curable composition comprising:
(a) from 60 to 99 wt. % of a mixture of a cyanate ester and a bismaleimide;
(b) from 40 to 1 wt. % of the diallylether of a bisphenol;
(c) from 20 to 80 wt. % of carbon fiber.

10. The composition of claim 9 wherein component (a) comprises a cyanate ester and a bismaleimide in a weight ratio of from 1:1 to about 20:1.

11. The composition of claim 9 wherein the cyanate ester is selected from the dicyanate esters of bisphenols and the bismaleimide is selected from the bismaleimides of aromatic diamines.

12. The composition of claim 9 wherein the said bisphenol, is selected from the group consisting of bisphenol A, bisphenol S, bisphenol F, biphenol, a di(hydroxyphenoxy)-benzene, a bis-(hydroxyphenoxy)-diphenyl sulfone, a bis-(hydroxyphenoxy)-diphenyl ketone, biphenol, and mixtures thereof.

13. A cured theremoset resin composite of from 20 to 80 parts by weight carbon fiber and from 80 to 20 parts by weight of a composition comprising from about 60 to about 99 wt. % of a mixture of a cyanate ester and a bismaleimide in a wt. ration of from 1:1 to about 20:1, and from about 40 to about 1 wt. % of the diallylether of a bisphenol selected from the group consisting of bisphenol S, bisphenol A, bisphenol F, biphenol and mixtures thereof.

* * * * *